(12) United States Patent
Nakajima

(10) Patent No.: US 7,558,904 B2
(45) Date of Patent: Jul. 7, 2009

(54) CONTROLLER, DATA MEMORY SYSTEM, DATA REWRITING METHOD, AND COMPUTER PROGRAM PRODUCT

(75) Inventor: Isamu Nakajima, Tokyo (JP)

(73) Assignee: Spansion LLC, Sunnyvale, CA (US)

( * ) Notice: Subject to any disclaimer, the term of this patent is extended or adjusted under 35 U.S.C. 154(b) by 463 days.

(21) Appl. No.: 11/187,650

(22) Filed: Jul. 22, 2005

(65) Prior Publication Data

US 2006/0018227 A1 Jan. 26, 2006

Related U.S. Application Data

(63) Continuation of application No. PCT/JP2004/010493, filed on Jul. 23, 2004.

(51) Int. Cl.
*G06F 12/00* (2006.01)
*G11B 7/00* (2006.01)

(52) U.S. Cl. .................. 711/103; 711/154; 711/165; 711/200

(58) Field of Classification Search ................ 711/100, 711/102, 103, 165, 170, 154, 202; 369/53.2, 369/47.1
See application file for complete search history.

(56) References Cited

U.S. PATENT DOCUMENTS 5,946,714 A * 8/1999 Miyauchi .................. 711/205
2005/0204115 A1 * 9/2005 Matsuno et al. ............ 711/203

FOREIGN PATENT DOCUMENTS

| JP | 2582487 | | 11/1996 |
| JP | 2002-229847 | * | 8/2002 |
| JP | 2002229847 | | 8/2002 |
| JP | 2004206381 | | 7/2004 |

* cited by examiner

*Primary Examiner*—Tuan V. Thai

(57) ABSTRACT

The controller of the present invention includes an address management table that stores address information of valid data among the data stored in a flash memory, a status flag stored in the flash memory indicating that the data before rewriting and the data after rewriting are in process of rewriting, and a data rewriting process unit (the data management means) that changes the address information of the valid data from the data before rewriting to the data after rewriting at a given timing. It is thus possible to specify an area in process of rewriting even if the power supply is stopped in process of rewriting. It is also possible to judge the valid data when the process is restarted from the power off and erase the unnecessary data.

13 Claims, 8 Drawing Sheets

FIG. 3
ADDRESS MANAGEMENT TABLE
| VIRTUAL ADDRESS | PHYSICAL ADDRESS |
|---|---|
| 0123 FFFF | 0192 7363 |
| 0000 1111 | 0456 ABCD |
| | |
| | |
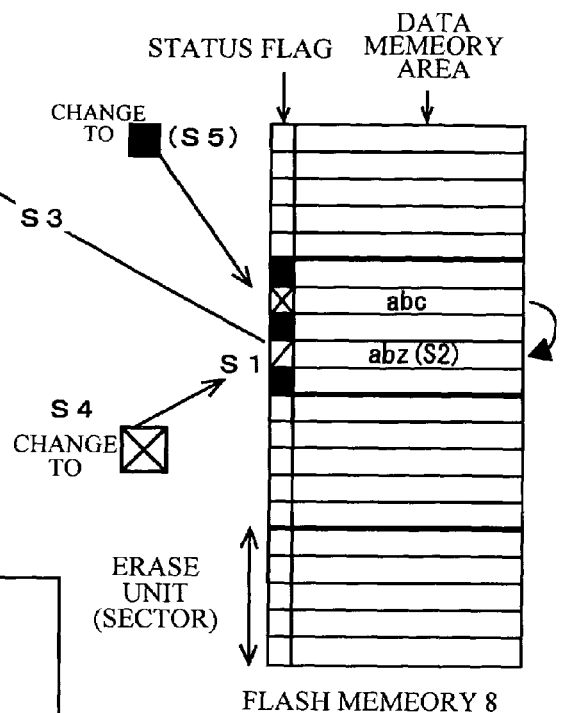
STATUS FLAG
- ☐ EMPTY
- ▨ WRITE START (IN PROCESS OF WRITING)
- ☒ COMPLETION OF WRITING
- ■ ERASED
FIG. 4A    FIG. 4B    FIG. 4C
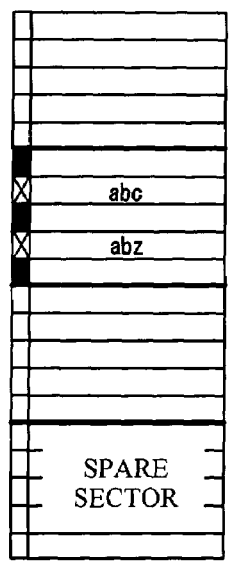 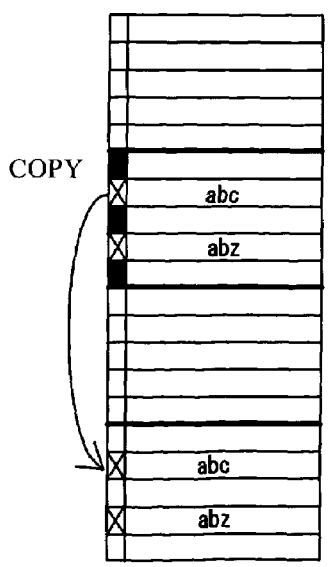 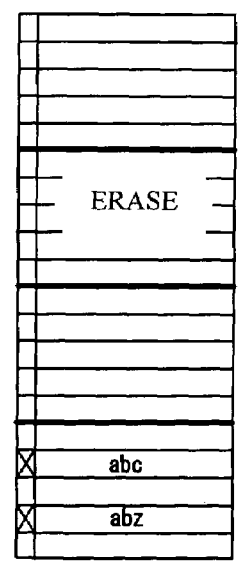

FIG. 9
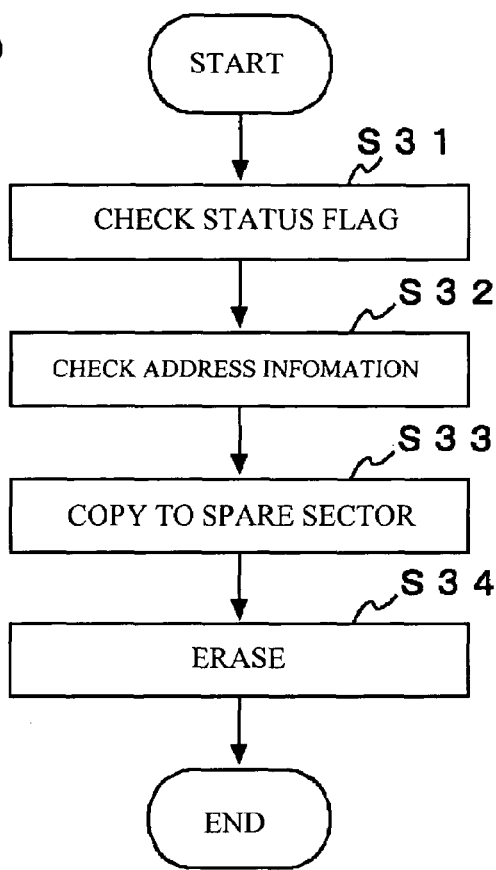
FIG. 10A    FIG. 10B    FIG. 10C
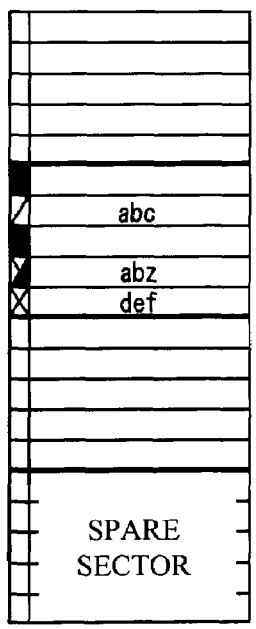
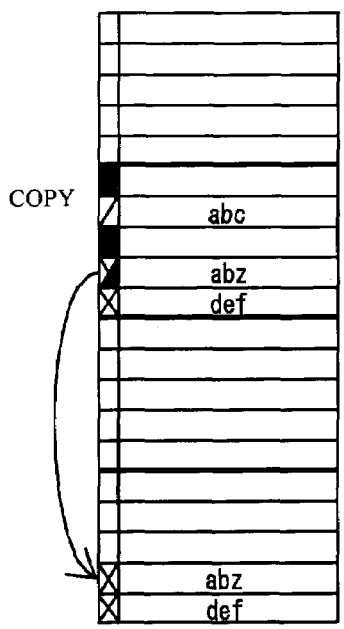
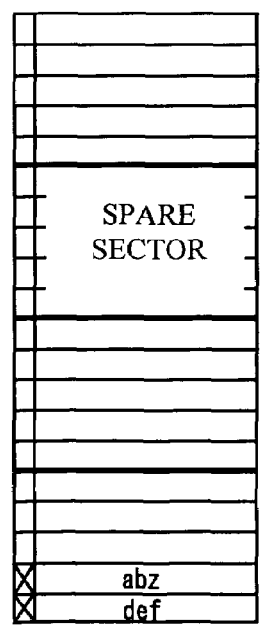

CONTROLLER, DATA MEMORY SYSTEM, DATA REWRITING METHOD, AND COMPUTER PROGRAM PRODUCT

CROSS REFERENCE TO RELATED APPLICATIONS

This is a continuation of International Application No. PCT/JP2004/010493, filed Jul. 23, 2004.

BACKGROUND OF THE INVENTION

1. Field of the Invention

The present invention relates to controllers that control data writing to semiconductor devices, and more particularly, to a data rewriting method that can recover data, even if power turns off in process of writing and the data processing is interrupted.

2. Description of the Related Art

FIG. 1 shows a system structure in which the data is stored and managed in a non-volatile semiconductor memory device such as flash memory. In the system structure shown in FIG. 1, a CPU 1 writes data into a RAM 6 or a flash memory 8 by way of a data bus 11, and reads data or a program out of a ROM 4, the RAM 6, or the flash memory 8. Also, the CPU 1 sends address information through an address bus 10 in order to read the data from the flash memory 8.

A ROM controller 3 outputs the data in the ROM 4 onto a data bus 11, and reads the address information on the address bus 10 into the ROM 4. In the same manner, a RAM controller 5 outputs data in the RAM 6 onto the data bus 11, and reads the data on the data bus 11 into the ROM 4. Also, the RAM controller 5 reads the address information output onto the address bus 10 into the RAM 6. In the same manner, a flash controller 7 outputs data in the flash memory 8 onto the data bus 11, and reads the data output onto the data bus 11 into the flash memory 8. Also, the flash controller 7 reads the address information output onto the address bus 10 into the flash memory 8.

In addition, as shown in FIG. 1, a main buttery 2 is provided for supplying the power to the CPU 1, the ROM 4, the RAM 6, and the flash memory 8.

A description will be given of a procedure of rewriting the data stored in the flash memory 8, with reference to FIGS. 2 and 3. FIG. 2 is a flowchart showing the procedure of rewriting the data. FIG. 3 shows structures of the flash memory 8 and an address management table. The address management table manages physical addresses of the flash memory 8 and virtual addresses used in the CPU 1. FIG. 3 also shows the procedure of rewriting the data with the aforementioned addresses. Here, the virtual address denotes a virtually given address when the CPU 1 manages the memories. The address management table translates the virtual address of the memory into the actual physical address.

First, a write start status is set to a flag that shows the status of an area in which the data is to be stored (step S1). As shown in FIG. 3, the flash memory 8 includes a data memory area and a status flag (management) area. The actual data is written into the data memory area, and the status flag area indicates the status of the data memory area. Status flags include an empty flag, a write start flag, a completion of writing flag, and an erased flag. The empty flag indicates that the data is not written and the data memory area is empty. The write start flag indicates that the data memory area is in process of rewriting. The completion of writing flag indicates that writing has been completed. The completion of erasing flag indicates that the data has been erased virtually. When the flag indicating the status of the data memory area is set to the write start flag, the corresponding data memory area is recognized as in process of rewriting the data.

The actual data in written after the status flag is written (step S2). Here, for example, a data "abz" is written, as shown in FIG. 3.

Then, the address information is changed (step S3). The physical address of the flash memory 8 associated with the virtual address is registered in the address management table, as shown in FIG. 3. The physical address associated with the virtual address is changed from the physical address of the data before rewriting to that of the data after rewriting. In this step, the effective data is changed from the data before rewriting to the data after rewriting.

Next, the completion of writing flag is written (step S4). The status flag of the data memory area into which the data has been written is set to the completion of writing flag. When the flag indicating the status of the data memory area is set to the completion of writing flag, the corresponding data memory area is recognized that the data rewriting is completed.

Next, the status flag of the data memory area, into which old data ("abc" shown in FIG. 3) is written, is changed to the erased flag from the completion of writing flag. After the flag is changed to the erased status, the data is recognized as invalid at a garbage collection process, as will be described later, and the data is thus erased actually.

Japanese Patent No. 2582487 (hereinafter, referred to as Document 1) describes that the file can be recovered by recording the statuses of the multiple sectors included in the memory block in the sector management table. If the power turns off in process of writing, the file can be recovered with the data of the sector in which the status indicates invalid.

However, on the above-mentioned data rewriting procedure, if the power supply from the main buttery 2 stops in process of rewriting the data, both of the data before rewriting and the data after rewriting are recognized as valid data. That is, on the above-mentioned data rewriting procedure, if the power turns off after the step S4 is completed, the process is stopped in the condition that the data before rewriting and the data after rewriting have both the statuses of the completion of writing flags. So, the above-mentioned data are both judged valid, because the data is judged whether the data is valid or invalid on the basis of the status flag in the garbage collection process. This causes a problem in that the data memory area including an invalid old data cannot be reproduced into a new area having the status into which the data can be written.

In the garbage collection process, only the data having the completion of writing flag is copied to a spare sector of the flash memory 8 shown in FIG. 4A. Referring to FIG. 4B, if the copy of the data having the completion of writing flag is completed, the original sector of the copy is erased, as shown in FIG. 4C. Therefore, the invalid data "abc" is also copied to the spare sector, and the invalid data cannot be erased.

If all of the areas in the flash memory 8 are searched for the data of the physical address to which the virtual address is not assigned, referring to the address management table shown in FIG. 3, it will be possible to search the invalid data. However, it takes time to perform the process.

Besides, the data is managed for every sector with the sector management table in Document 1, and it is not possible to determine the data whether the data is valid or invalid in a smaller unit than the sector.

Moreover, the sector management table is referred and the data in the invalid sector is searched, if the power turns off in process of writing. Then, the data of the searched sector is rewritten into valid. That is, whenever the power is off in process of writing, the old data is set to valid and the new data is set to invalid. In other words, the data writing is started again from the beginning, and the data writing cannot be restarted from the previous process when the power turns off.

SUMMARY OF THE INVENTION

The present invention has been made in view of the above circumstances and provides a controller, a data memory system, a data rewriting method, and a computer program product, which are capable of finding a memory area in process of rewriting and performing an optimal recovery process according to the timing when the power turns off, even if the power supply is stopped in process of data rewriting.

According to an aspect of the present invention, preferably, there is provided a controller for controlling writing of data into a semiconductor device including a data management unit creating first management information showing that first data that has been stored in the semiconductor device is in process of rewriting and second management information showing that second data to be newly written into the semiconductor device is in process of rewriting.

The data management unit creates first management information showing that first data that has been stored in the semiconductor device is in process of rewriting and second management information showing that second data to be newly written into the semiconductor device is in process of rewriting. It is thus possible to specify the area that has been rewritten, even if the power supply is stopped in process of rewriting.

On the above-mentioned controller, the data management unit may include: an address management table that stores address information on valid data; and a rewriting process unit that stores the first and second management information at the time of rewriting and changes the address information on the valid data from address information on the first data to address information on the second data at a given timing. Thus configured controller makes it possible to set either the first data or the second data valid according to the progress of rewriting the data. It is thus possible to know the progress of the data rewriting process and perform the data recovery process optimally, if the power turns off and the data is to be recovered.

On the above-mentioned controller, the first management information may include management information that shows the first data is valid until rewriting is completed; and the second management information includes management information that shows the second data is set valid after rewriting is completed. With this configuration, the data that is being rewritten can be judged whether the data is the first data before rewriting or the second data after rewriting. It is thus possible to know the progress of the data rewriting process and perform the data recovery process optimally, if the power turns off and the data is to be recovered.

The above-mentioned controller may further include a part that writes the first management information and the second management information in the semiconductor device along with the first and second data. The first management information and the second management information are recorded in the semiconductor device together with the data, and accordingly another means do not have to be provided for storing the management information separately.

The above-mentioned controller may further include a part that writes the address information on the valid data into another semiconductor device. The address information is recorded in another storage device, and the semiconductor device does not have to provide a space for storing the management information.

On the above-mentioned controller, the address management unit may include an address management table that stores a virtual address associated with a physical address of valid data stored in the semiconductor device; and the controller comprises a rewriting process unit that changes the physical address from a physical address of the first data to that of the second data at a given timing. The physical address corresponding to the virtual address is changed at the given timing, and an external device does not have to recognize the physical address of the semiconductor device so as to read the valid data.

On the above-mentioned controller, the first management information may include management information that shows the first data is valid until rewriting is completed, and the second management information includes management information that shows the second data is set valid after rewriting is completed; the data management unit includes an address management table that stores address information on valid data; and the controller includes a garbage collection unit that newly writes only valid data into another area in the semiconductor device by referring to the first management information and/or the second management information and the address management table. In the garbage collection process, only the data registered as the valid one is written into another area in the semiconductor device, and it is thereby possible to erase unnecessary data.

On the above-mentioned controller, the first management information may include management information that shows the first data is valid until rewriting is completed, and the second management information includes management information that shows the second data is set valid after rewriting is completed; the data management unit includes an address management table that stores address information on valid data; and the controller includes a recovery unit that refers to the first management information and/or the second management information and the address management table when a supply of power to the semiconductor device stops during a rewriting process, and restarts rewriting on the basis of a status of progress of the rewriting process identified by the first management information and/or the second management information and the address management table. If the power supply to the semiconductor device is stopped in process of rewriting the data, the recovery process means detects the data in process of rewriting and determines the progress of the rewriting process with the detected management information and the valid data stored in the address management table. It is thereby possible to restart rewriting from the process that has been stopped due to the power off.

According to another aspect of the present invention, preferably, there is provided a system including: a memory; and a controller including a data management unit that creates first management information showing that first data that has been stored in the memory is in process of rewriting and second management information showing that second data to be newly written into the memory is in process of rewriting, data and the first and second management information being written into the memory under a control of the controller. With this configuration, it is possible to judge the valid data and invalid data at the time of rewriting the data and provide a data storage system having the valid data only stored in the semiconductor device.

According to another aspect of the present invention, preferably, there is provided a method of rewriting data into a semiconductor device comprising the steps of: storing first management information showing that a memory area in the semiconductor device having first data to be replaced is in process of rewriting; writing second data into another memory area; and storing second management information showing that said another memory area is in process of rewriting. There are created the first management information showing that first data that has been stored in the semiconductor device is in process of rewriting and second management information showing that second data to be newly written into the semiconductor device is in process of rewriting. It is thus possible to specify the area that has been rewritten, even if the power supply is stopped in process of rewriting.

The above-mentioned method may further include the steps of: changing information registered in an address management table storing address information on valid data from address information on the first data to address information on the second data; and changing the second management information to third management information indicating completion of rewriting.

The address information of the valid data is managed with the address management table, and it is thereby possible to selectively change the data to be valid according to the progress of the rewriting process. It is thus possible to know the progress of rewriting and perform the data recovery process optimally, if the power is stopped and the data has to be recovered.

The above-mentioned method may further include the steps of: detecting the first management information and/or the second management information; determining whether data indicated by management information detected is registered in the address management table as valid data; and newly writing only data registered as valid data into another area of the semiconductor device. It is possible to erase the unnecessary data by newly writing only the data registered as the valid data into said another area.

The above-mentioned method may further include the steps of: identifying data in process of rewriting by referring to the first management information and/or the second management information when a supply of power to the memory stops during a rewiring process; recognizing a status of progress of the rewriting process on the basis of management information referred to and valid data indicated by the address management table; and restarting writing on the basis of the status of progress of the rewriting process. If the power supply to the semiconductor device is stopped in process of rewriting the data, the recovery process means detects the data in process of rewriting and determines the progress of the rewriting process with the detected management information and the valid data stored in the address management table. It is thereby possible to restart rewriting from the process that has been stopped due to the power off.

According to another aspect of the present invention, preferably, there is provided a computer program product causing a computer to execute the following steps of: storing first management information showing that a memory area in the semiconductor device having first data to be replaced is in process of rewriting; writing second data into another memory area; and storing second management information showing that said another memory area is in process of rewriting.

The present invention makes it possible to readily specify an area in process of rewriting even if the power supply is stopped in process of rewriting the data and select the most suitable recovery process according to the timing of the power off.

BRIEF DESCRIPTION OF THE DRAWINGS

FIG. 3 is a view illustrating data rewriting procedure of the flash memory 8;

FIG. 4 is a view showing a conventional garbage collection process procedure, FIG. 4A is a view before the garbage collection, FIG. 4B is a view showing the data copied to a spare sector, and FIG. 4C is a view showing an original data being erased;

FIG. 9 is a flowchart showing a garbage collection procedure; and

FIG. 10 is a view illustrating the garbage collection process procedure, FIG. 10A a view before the garbage collection, FIG. 10B is a view showing the data copied to a spare sector, and FIG. 10C is a view showing an original data being erased.

DESCRIPTION OF THE PREFERRED EMBODIMENTS

A description will now be given, with reference to the accompanying drawings, of embodiments of the present invention.

Figure 1:
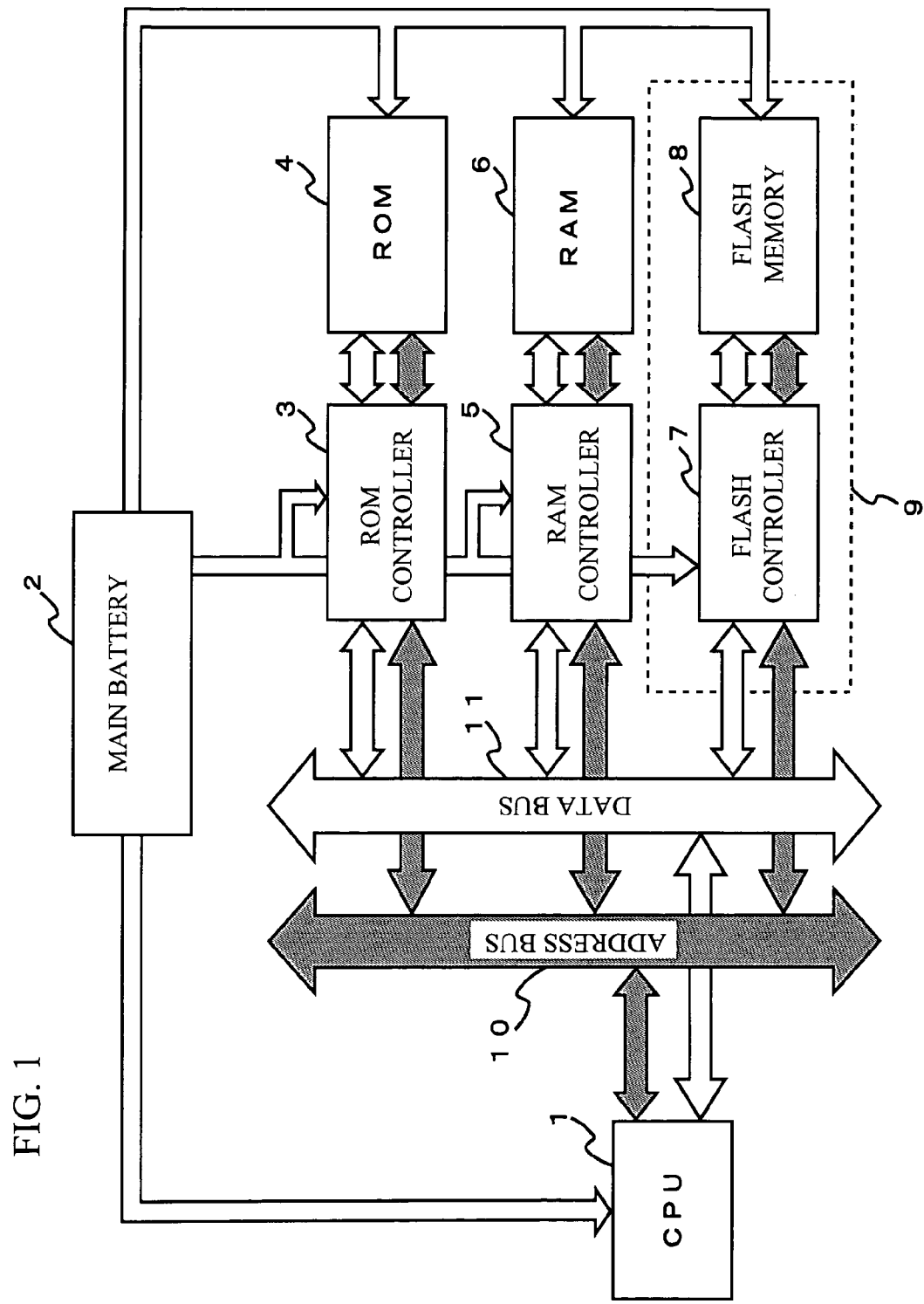
FIG. 1 is a view illustrating a connection structure of a flash memory controller 7, a flash memory 8, and a CPU 1 that writes and reads the data into and from the flash memory.
Figure 2:
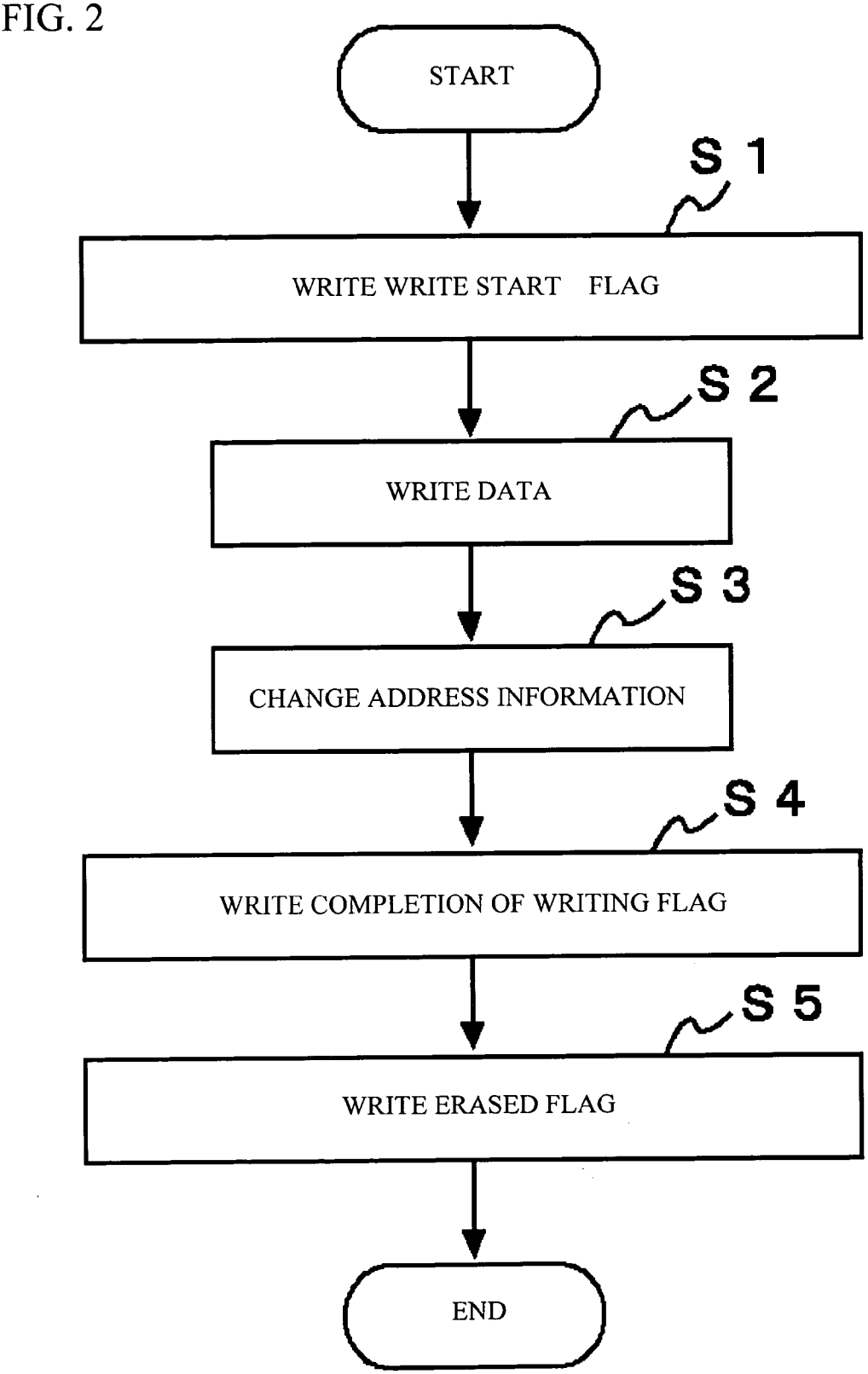
FIG. 2 is a flowchart showing a conventional data rewriting.

First, a description will be given of a system structure of the present embodiment. The system of the present embodiment includes, as shown in FIG. 1, the CPU 1, the ROM 4, the RAM 6, and the flash memory 8 are connected through the data bus 11 and the address bus 10. The ROM controller 3 outputs the data of the ROM 4 onto the data bus 11, and reads the address information output on the address bus 10 into the ROM 4. The RAM controller 5 reads the address information on the address bus 10 and the data on the data bus 11 into the RAM 6, and outputs the data of the RAM 6 onto the data bus 11. The flash controller 7 reads the address information on the address bus 10 and the data on the data bus 11 into the flash memory 8, and outputs the data of the flash memory 8 onto the data bus 11. The ROM 4, the RAM 6, the flash memory 8, the ROM controller 3, the RAM controller 5, and the flash controller 7 operate with the power supply from the main buttery 2 shown in FIG. 1.

The CPU 1 designates the data that has been written into or the data to be written into the flash memory 8 with the use of the virtual address. This virtual address is translated into the physical address of the flash memory 8 by the flash controller 7 so that the actual data reading or writing may be performed. The flash memory 8 and the flash controller 7 operate as a data memory system 9. The system shown in FIG. 1 includes the flash controller 7 and the flash memory 8 provided separately. However, the flash memory 8 and the flash controller 7 may be integrated into a one-chip LSI. Also, the flash memory controller 7 may be incorporated on the CPU 1.

Figure 5:
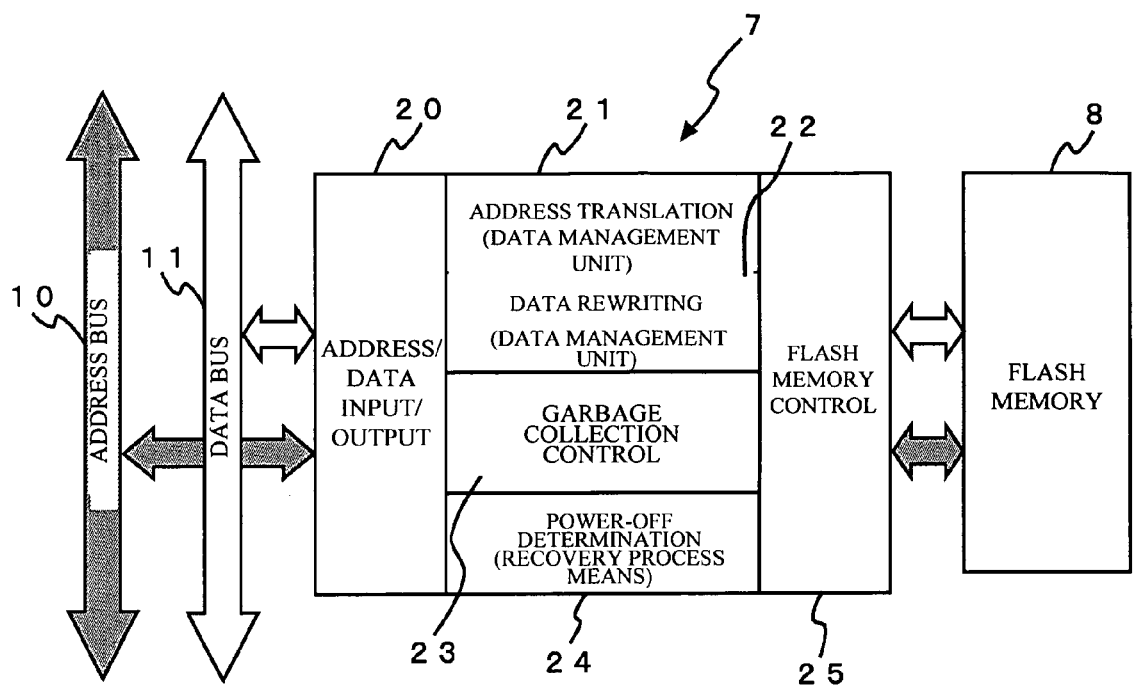
FIG. 5 is a view showing a detailed configuration of the flash controller 8.

Next, a description will be given of the structure of the flash controller 7 that controls writing and reading the data into and from the flash memory 8, with reference to FIG. 5. The flash controller 7 includes an address/data input and output unit 20, an address translation unit (data management means) 21, a data rewriting process unit (the data management means) 22, a garbage collection control unit 23, a power-off judge unit (recovery process means) 24, and a flash memory control unit 25.

The address/data input and output unit 20 inputs the address information and the data output onto the address bus 10 and the data bus 11 into the flash controller 7. The address/data input and output unit 20 outputs the data read from the flash memory 8 onto the data bus 11.

The address translation unit (the data management means) 21 includes an address management table 15, as will be described later, and the (virtual) address designated by the CPU 1 is translated into the (physical) address of the flash memory 8.

The data rewriting process unit (the data management means) 22 controls the flash memory 8 to rewrite the data of the (virtual) address designated by the CPU 1.

The garbage collection control unit 23 manages a writable area size of the flash memory 8, and carries out the garbage collection as necessary.

The power-off judge unit (recovery process means) 24 monitors the power supply from the power unit such as the main buttery 2 or the like. If the power supply is stopped, the power-off judge unit (recovery process means) 24 performs the recovery process on the flash memory 8.

The flash memory control unit 25 writes, reads, and erases the data, after the processes of the data rewriting process unit (the data management means) 22, the garbage collection control unit 23, and the power-off judge unit (recovery process means) 24.

Next, a description will be given of the data rewriting procedure of the present embodiment with reference to a flowchart shown in FIG. 6 and FIG. 7. Here, a description will be given of the procedure of rewriting "abc", which has already been written in the flash memory 8, into "abz". FIG. 7 shows the flash memory 8 and the address management table 15 to illustrate the data rewriting procedure.

First, the status flag of the data memory area in the flash memory 8, into which the new data is to be written, is changed to "the new data in process of rewriting" (step S10). The data rewriting process unit (the data management means) 22 changes the status flag of the memory area into which the new data is to be written into the status flag indicating "the new data in process of rewriting" by way of the flash memory control unit 25. Also, according to the present embodiment, the data rewriting is controlled with a smaller unit than the sector, which is a data erase unit, as shown in FIG. 7. The status flag shown in FIG. 7 is provided for every page that is smaller than the sector, and it is thus possible to control and manage the status of data and the empty space with a smaller unit.

The flash memory 8 includes data memory areas 13 and status flag (management) areas 14. The data is input into the data memory area 13, and the status flag (management) area 14 indicates the status of the data in the data memory area 13. The status flag (management) area 14 is provided for every data memory area 13. The controller 7 uses the status flag as the management information, and manages the data to be written into the flash memory 8. The status flag serving as the management information includes an empty flag indicating that the data memory area does not include the data and is empty, process of rewriting flag indicating that the old data is included and is in process of rewriting, a completion of writing flag indicating that the writing has been completed, a completion of erasing flag indicating that the data has been erased virtually, and a status flag indicating the new data in process of rewriting.

When the status flag of the status flag (management) area 14 is changed, the data rewriting process unit (the data management means) 22 inputs the data into the data memory area in which the status flag is changed (step S11). The data "abz" is written into the data memory area into which the data is newly written, as shown in step S11 in FIG. 7.

Next, the status flag of the data memory area having the old data (abc) therein is changed into the status flag indicating that "the old data in process of rewriting" (step S12). The data rewriting process unit (the data management means) 22 changes the status flag of the data memory area having the old data (abc) therein in step S12 shown in FIG. 7, into the "old data in process of rewriting".

Next, the address information is changed (step S13). The address management table 15 retained by the address translation unit (the data management means) 21 is rewritten, and the address information that associates the virtual address and the physical address is changed. That is, the virtual address, which has been associated with the physical address of the data memory area having the old data therein, is associated with the physical address of the data memory area having the new data therein.

Next, the status flag of the area having the old data (abc) therein is changed into the status flag indicating "erased" (step S14). The data rewriting process unit (the data management means) 22 changes the status flag of the area having the old data therein shown in step S14 in FIG. 7 into the flag indicating "erased". The status flag is changed into "erased", and it is therefore possible to set the status of the data to such a state that the garbage collection process can erase the data.

Next, the status flag of the area into which the new data (abz) is written is changed into the status flag indicating the "completion of writing" (step S15). The data rewriting process unit (the data management means) 22 sets the status flag to "completion of writing" as shown in step S15 in FIG. 7. Thus, the data rewriting is completed. Here, the status flag of the area having the new data therein may be changed into "completion of writing" before the status flag of the area having the old data therein is changed into "erased".

In this manner, the present embodiment includes the controller 7 uses the status flag indicating "the old data in process of rewriting" that denotes the data is in process of rewriting and is valid before the data is completed rewriting. The controller 7 also uses the status flag indicating "the new data in process of rewriting" that denotes the data is in process of rewriting and becomes valid after the data is completed rewriting. It is thus possible to prevent the old data and the new data from being recognized as valid data that has been rewritten simultaneously.

In addition, even if the power is off in process of rewriting the data, the area in which the data is in process of rewriting can be specified by searching the status flag indicating in process of writing. Further, which the old data or the new data is valid can be determined by searching the address management table 15 with the designated physical address. It is thus possible to erase the invalid data from the flash memory 8, when carrying out the garbage collection.

Figure 8:
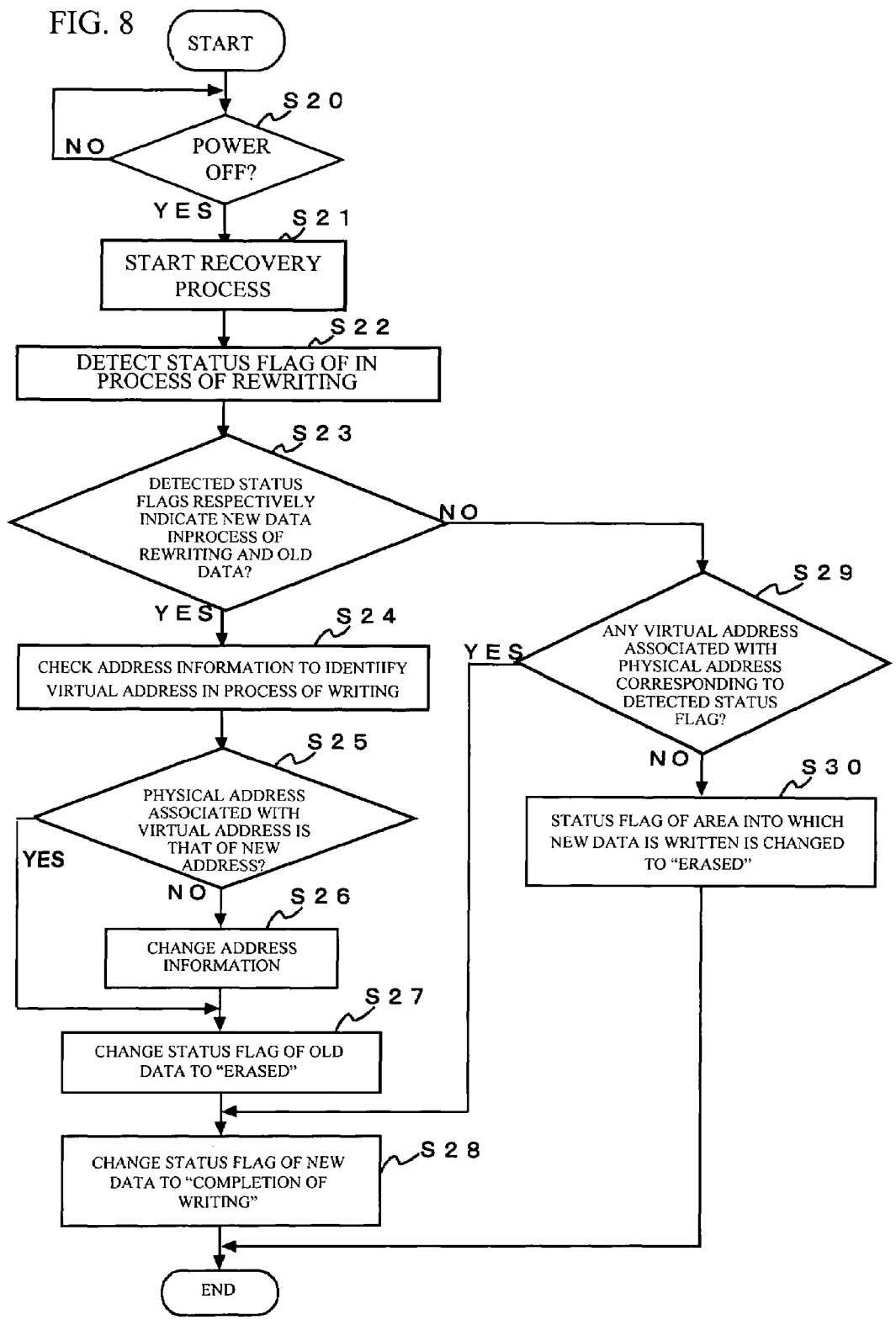
FIG. 8 is a flowchart showing a recovery process.

Next, a description will be given of a procedure of restarting the process after the power supply turns off in process of rewriting the data, with reference to a flowchart shown in FIG. 8. If the power-off judge unit (recovery process means) 24 of the controller 7 detects that the power is off (YES in step S20), the recovery process is started (step S21). The power-off judge unit (recovery process means) 24 detects the status flag indicating "in process of rewriting" from the status flag (management) area 14 (step S22) of the flash memory 8. If the status flag "in process of rewriting" is detected, the power-off judge unit (recovery process means) 24 confirms whether or not both of the status flag indicating "the new data in process of rewriting" and the status flag indicating "the old data in process of rewriting" have been detected (step S23).

If the status flag indicating "the new data in process of rewriting" and the status flag indicating "the old data in process of rewriting" are both detected (step S23/YES), the address information is checked for the virtual address in process of writing. If the status flag indicating "the new data in process of rewriting" and the status flag indicating "the old data in process of rewriting" can be both detected, which means that the process up to the step S12 in FIG. 6 is completed. The power-off judge unit (recovery process means) 24 judges whether the physical address associated with the virtual address in process of rewriting represents the new data or the old data, and restarts the data rewriting process.

It is possible to detect the physical address of the flash memory 8 in which the data in process of rewriting is stored, by detecting the status flag indicating "in process of rewriting". The power-off judge unit (recovery process means) 24 refers to the address management table 15 of the address translation unit (data management means) 21 to detect the virtual address associated with the detected physical address (step S24). If the virtual address is specified, the power-off judge unit (recovery process means) 24 confirms whether the physical address associated with the virtual address indicates the new data or the old data (step S25). If the physical address associated with the virtual address in process of rewriting indicates the old data (step S25/NO), the address of the area having the new data therein is associated with the virtual address and is stored in the address management table 15 (step S26). Then, the status flag of the old data is changed into "erased" (step S27), and the status flag of the new data is set to "completion of writing". Also, if the physical address associated with the virtual address in process of rewriting indicates the new data (step S25/YES), the status flag of the old data is changed into "erased" (step S27), and the status flag of the new data is set to "completion of writing".

If only one status flag indicating in process of rewriting is detected (step S23/NO), the detected flag indicates the status of the new data. The status flag indicating the new data as described above is changed at the beginning and in the end of the data rewriting process procedure, and only the status flag indicating the old data is not detected alone. In this case, the power is off after the status flag has been rewritten in step S10 in FIG. 6, after the data is in process of writing or has been written in step S11, or after the status flag of the old data has been changed to "erased" in step S14. The power-off judge unit (recovery process means) 24 confirms whether there is the virtual address associated with the physical address corresponding to the detected status flag (step S29). If there is no virtual address associated with the physical address corresponding to the detected status flag (step S29/NO), the power is considered to have turned off after the above-mentioned step 10 is completed, or the step S11 is completed or in process. In this case, the writing cannot be restarted. Hence, the area into which the new data is written is changed to "erased" (step S30). If there is the virtual address associated with the physical address corresponding to the detected status flag (step S29/YES), it can be considered that the power has turned off after the status flag of the old data in step S14 is changed to "erased". Accordingly, the status flag of the new data is set to "completion of writing".

In this manner, the power-off judge unit (recovery process means) 24 is capable of restarting the data rewriting process and erasing unnecessary data due to the power off, even if the power turns off in process of rewriting the data, in accordance with the present embodiment. That is, if the power is off before the rewritten data becomes valid, it is possible to set the data before rewriting to valid. The data is not erased because of the power off. If the power turns off after the rewritten data becomes valid, the rewriting process can be completed by setting the rewritten data to the valid data and performing the post processing.

There are provided the status flag indicating "the new data in process of rewriting" and the status flag indicating "the old data in process of rewriting" in accordance with the present embodiment. This can make it possible to distinguish the data before rewriting from the data after rewriting. Hence, the data before rewriting may be determined to be the valid data when the power supply is stopped before rewriting is completed, according to the above-mentioned status flags, without referring to the valid data registered in the address management table 15. The data after rewriting may be determined to be the valid data when the power supply is stopped after rewriting is completed. In these cases, the address management table is corrected to designate the valid data. Even in this process, the valid data and invalid data can be determined and the invalid data can be erased from the flash memory 8.

Next, a description will be given of the procedure of the garbage collection with reference to FIGS. 9 and 10. FIG. 9 shows the procedure of the garbage collection. FIG. 10 shows states of the flash memory in the respective processes of the garbage collection. First, the garbage collection control unit 23 refers to the status flag (management) area 14 of the flash memory and checks the status flag (step S31). Judging from the status flag, the data "abc" and "abz" are in process of rewriting and the data "def" has been completed writing.

Then, the garbage collection control unit 23 refers to the address management table 15 to check the address information (step S32). The garbage collection control unit 23 determines which the physical address of "abc" or the physical address of "abz" is the valid data associated with the virtual address. Here, assuming that the physical address of "abz" is the valid data associated with the virtual address.

After the valid data and invalid data are determined, the valid data of "abz" and "def" are copied to spare sectors (step S33). Here, the status flag of "abz" indicates "in process of rewriting", and the status flag is changed to indicate "completion of writing" at the time of coping to the spare sectors.

After the valid data is completed copying to the spare sectors, the original sectors having the data therein are erased (step S34) and the original sectors are used as spare sectors. In this manner, the procedure of the garbage collection is completed.

The old data and the new data are not recognized as the valid data that have been completed rewriting at the same time, in accordance with the present embodiment. Hence, it is possible to erase unnecessary invalid data by the garbage collection process. It is thus possible to prevent the unnecessary data from storing in the flash memory 8.

The status flag is stored in the flash memory 8 in accordance with the embodiment described above. However, a memory area may be provided in the flash memory controller 7 so that the addresses of the data before writing and the data after writing in the flash memory 8 may be stored in the aforementioned memory area. In addition, the address information may be stored in another battery backup non-volatile memory, which is separately provided from the flash controller 7.

A description has been given of an example of data rewriting into the flash memory, in accordance with the above-described embodiment; however, this example is also applicable to another type of semiconductor device other than the flash memory.

Next, a description will be given of a second embodiment of the present invention. In the present embodiment, the CPU 1 reads out a data rewriting program stored in the ROM 4 or the flash memory 8, and controls the data rewriting in the flash memory 8 according to the program. That is, a program control of the CPU 1 realizes the respective functions of the controller 7 shown in FIG. 5.

Figure 6:
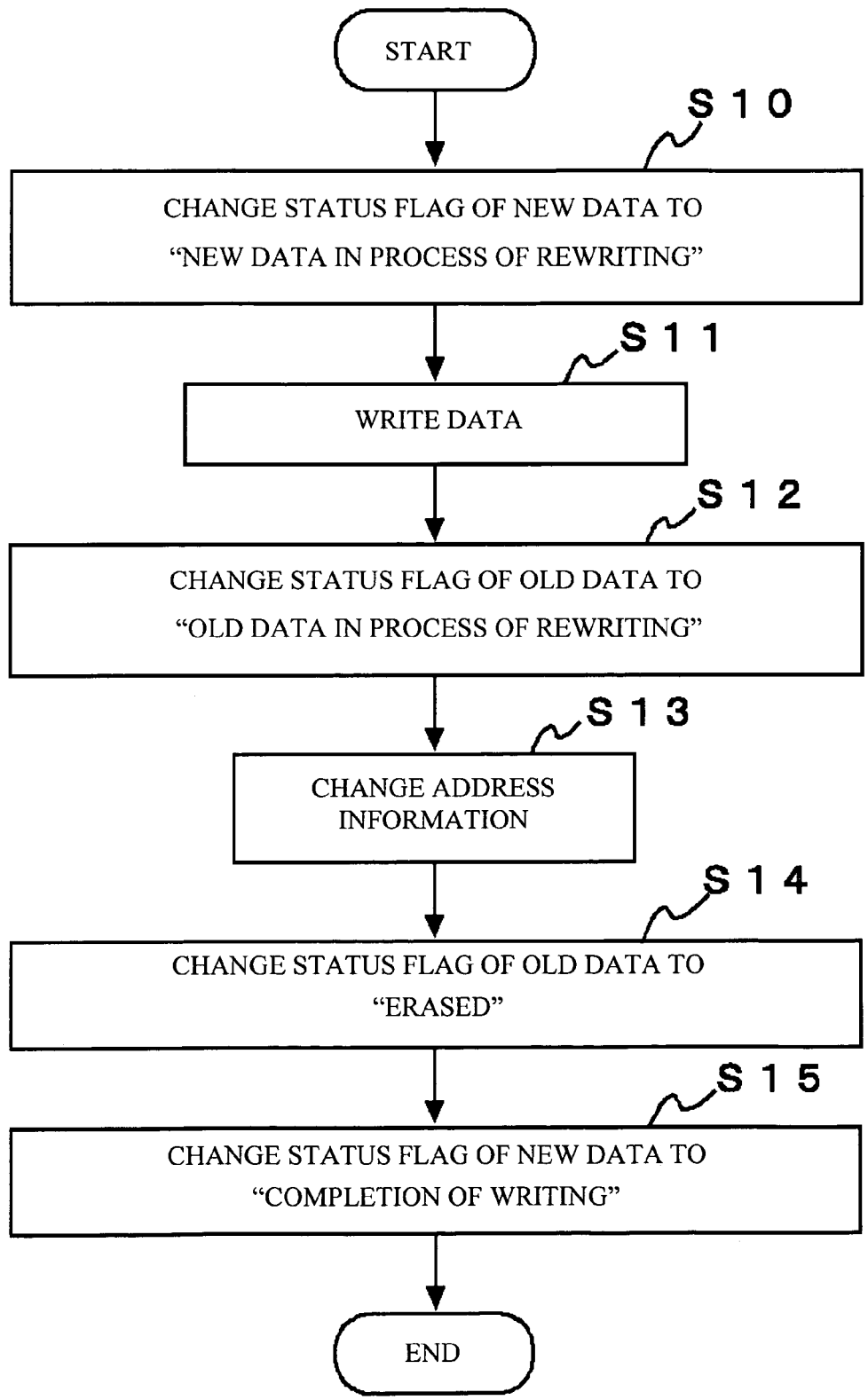
FIG. 6 is a flowchart showing the data rewriting procedure.
Figure 7:
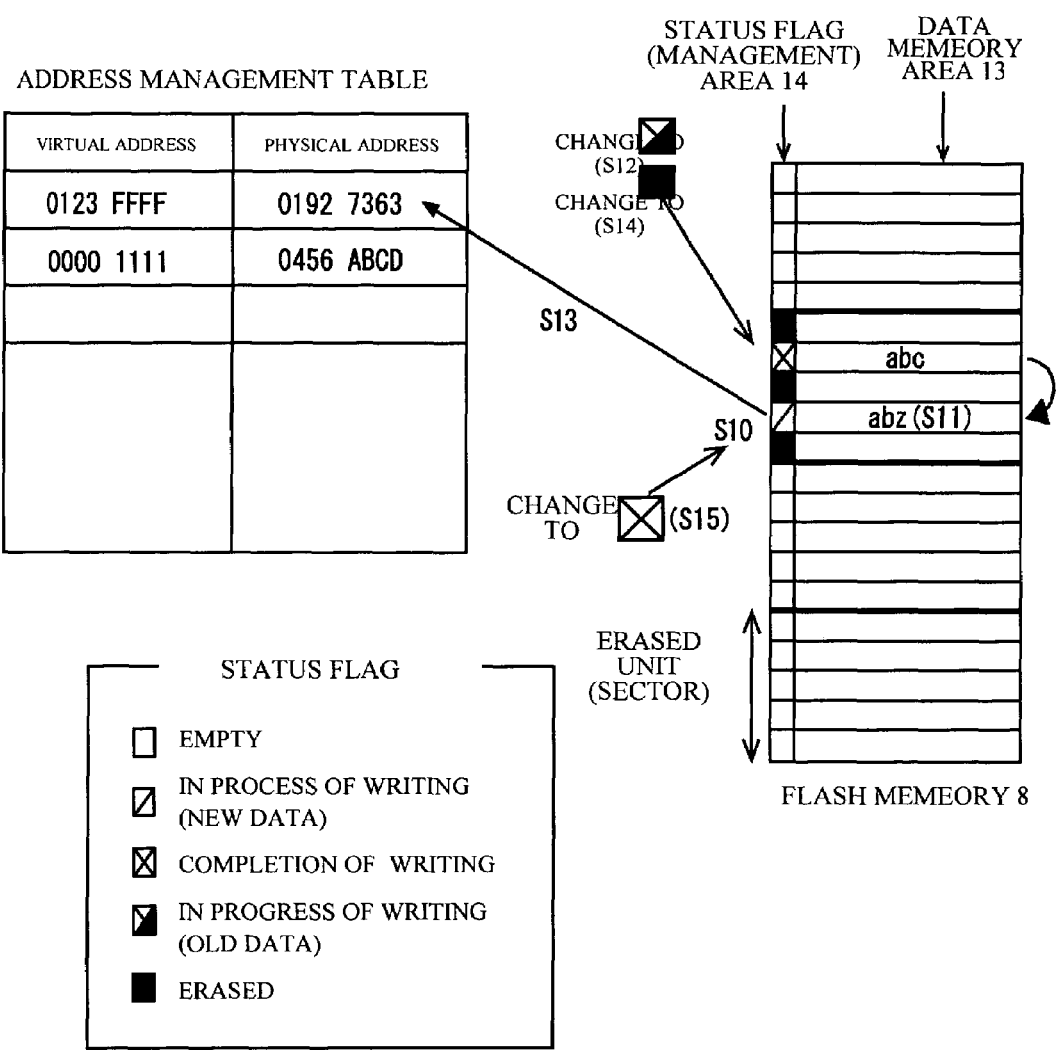
FIG. 7 is a view illustrating the data rewriting procedure of the flash memory 8.

The CPU 1 writes the status flag and the data into the flash memory 8, according to the flowchart shown in FIG. 6. Also, the CPU 1 retains the address management table 15 in the RAM 6 and manages the physical address of the flash memory 8 with the address management table 15.

Moreover, in the garbage collection, the CPU 1, according to the flowchart shown in FIG. 9, detects the status flag indicating in process of rewriting, transfers only the data registered in the address management table as the valid data to another memory area in the flash memory 8, and generates the area only for the valid data. In the recovery process, the CPU 1, according to the flowchart shown in FIG. 8, judges the progress of the interrupted rewriting process, and restarts rewriting from the interrupted process.

Thus described control of the CPU 1 makes it possible to obtain the same effect as that in the first embodiment.

The program illustrated in the flowchart is a computer readable program, and is another embodiment of a computer program product of the present invention. The computer program product of the present invention includes other types of memories or storage media in which the program is stated.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, another example of the flag may include one flag indicating that the memory area in which the new data is to be written is in process of rewriting and the other flag indicating that the memory area in which the old data has been written is in process of rewriting.

What is claimed is:

1. A controller for controlling writing of data into a semiconductor device comprising:
   a data management unit creating first management information showing that first data that has been stored in the semiconductor device is in process of rewriting and second management information showing that second data to be newly written into the semiconductor device is in process of rewriting, wherein the data management unit comprising:
   an address management table that stores address information on valid data; and
   a rewriting process unit that stores the first and second management information at the time of rewriting and changes the address information on the valid data from address information on the first data to address information on the second data at a given timing.

2. The controller as claimed in claim 1, wherein:
   the first management information includes management information that shows the first data is valid until rewriting is completed; and
   the second management information includes management information that shows the second data is set valid after rewriting is completed.

3. The controller as claimed in claim 1, further comprising a part that writes the first management information and the second management information in the semiconductor device along with the first and second data.

4. The controller as claimed in claim 1, further comprising a part that writes the address information on the valid data into another semiconductor device.

5. The controller as claimed in claim 1, wherein the address management unit comprises an address management table that stores a virtual address associated with a physical address of valid data stored in the semiconductor device; and
   the controller comprises a rewriting process unit that changes the physical address from a physical address of the first data to that of the second data at a given timing.

6. A controller for controlling writing of data into a semiconductor device comprising:
   a data management unit creating first management information showing that first data that has been stored in the semiconductor device is in process of rewriting and second management information showing that second data to be newly written into the semiconductor device is in process of rewriting, wherein:
   the first management information includes management information that shows the first data is valid until rewriting is completed, and the second management information includes management information that shows the second data is set valid after rewriting is completed;
   the data management unit includes an address management table that stores address information on valid data; and
   the controller includes a garbage collection unit that newly writes only valid data into another area in the semiconductor device by referring to the first management information and/or the second management information and the address management table.

7. A controller for controlling writing of data into a semiconductor device comprising:
   a data management unit creating first management information showing that first data that has been stored in the semiconductor device is in process of rewriting and second management information showing that second data to be newly written into the semiconductor device is in process of rewriting, wherein:
   the first management information includes management information that shows the first data is valid until rewriting is completed, and the second management information includes management information that shows the second data is set valid after rewriting is completed; the data management unit includes an address management table that stores address information on valid data; and
   the controller includes a recovery unit that refers to the first management information and/or the second management information and the address management table when a supply of power to the semiconductor device stops during a rewriting process, and restarts rewriting on the basis of a status of progress of the rewriting process identified by the first management information and/or the second management information and the address management table.

8. A method of rewriting data into a semiconductor device comprising the steps of;
   storing first management information showing that a memory area in the semiconductor device having first data to be replaced is in process of rewriting;
   writing second data into another memory area; and
   storing second management information showing that said another memory area is in process of rewriting, further comprising the steps of:

changing information registered in an address management table storing address information on valid data from address information on the first data to address information on the second data; and changing the second management information to third management information indicating completion of rewriting.

9. The method as claimed in claim 8, further comprising the steps of:
    detecting the first management information and/or the second management information;
    determining whether data indicated by management information detected is registered in the address management table as valid data; and
    newly writing only data registered as valid data into another area of the semiconductor device.

10. The method as claimed in claim 8, further comprising the steps of:
    identifying data in process of rewriting by referring to the first management information and/or the second management information when a supply of power to the memory stops during a rewiring process;
    recognizing a status of progress of the rewriting process on the basis of management information referred to and valid data indicated by the address management table; and
    restarting writing on the basis of the status of progress of the rewriting process.

11. A computer program product embodied in a computer readable storage medium and comprising computer instructions for causing a computer to execute the following steps of:
    storing first management information showing that a memory area in the semiconductor device having first data to be replaced is in process of rewriting;
    writing second data into another memory area; and
    storing second management information showing that said another memory area is in process of rewriting, further comprising the steps of:
    changing information registered in an address management table storing address information on valid data from address information on the first data to address information on the second data; and
    changing the second management information to third management information indicating completion of rewriting.

12. The computer program product as claimed in claim 11, further comprising the steps of:
    detecting the first management information and/or the second management information;
    determining whether data indicated by management information detected is registered in the address management table as valid data; and
    newly writing only data registered as valid data into another area of the semiconductor device.

13. The computer program product as claimed in claim 11, further comprising the steps of:
    identifying data in process of rewriting by referring to the first management information and/or the second management information when a supply of power to the memory stops during a rewiring process;
    recognizing a status of progress of the rewriting process on the basis of management information referred to and valid data indicated by the address management table; and
    restarting writing on the basis of the status of progress of the rewriting process.

* * * * *